Patented June 17, 1941

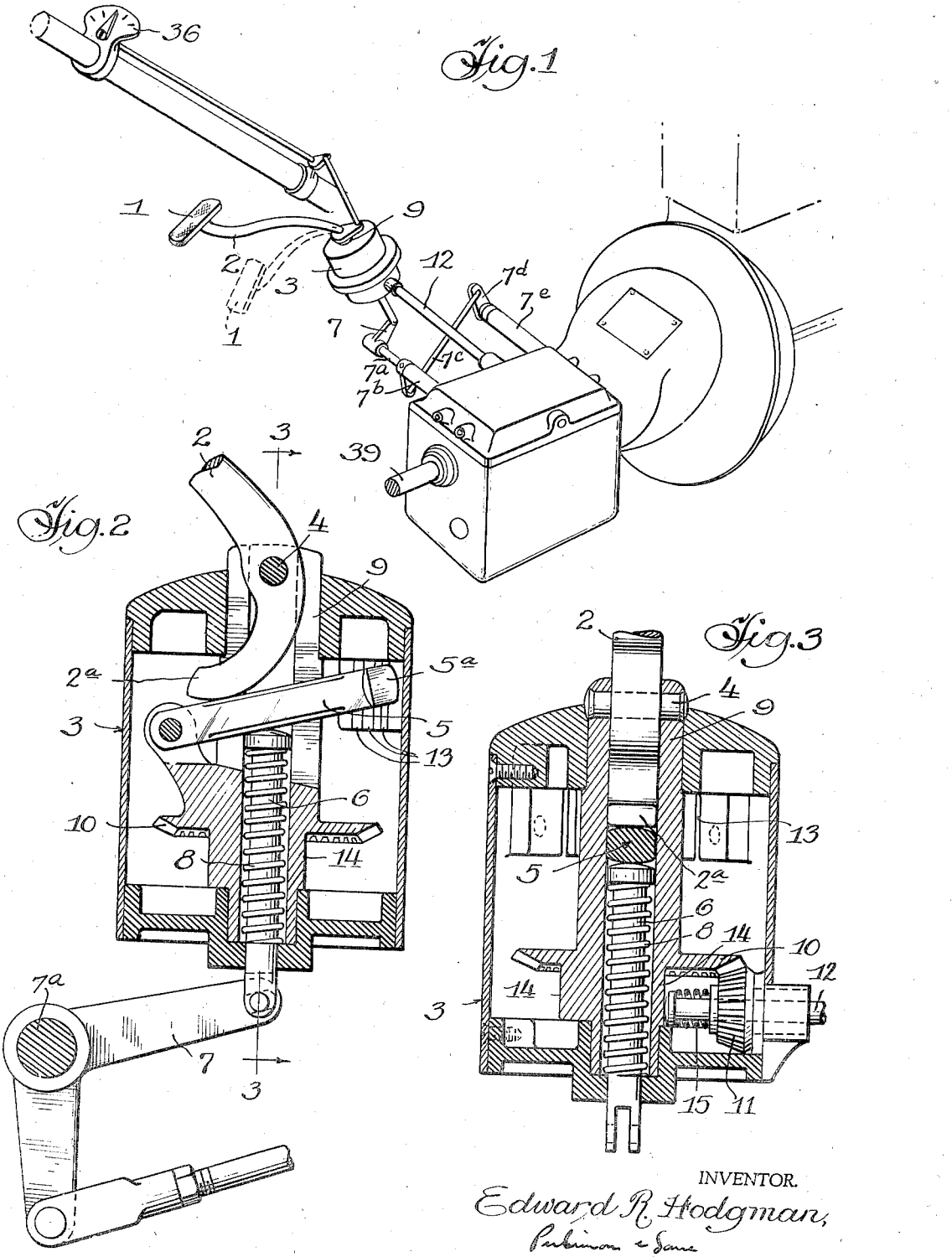

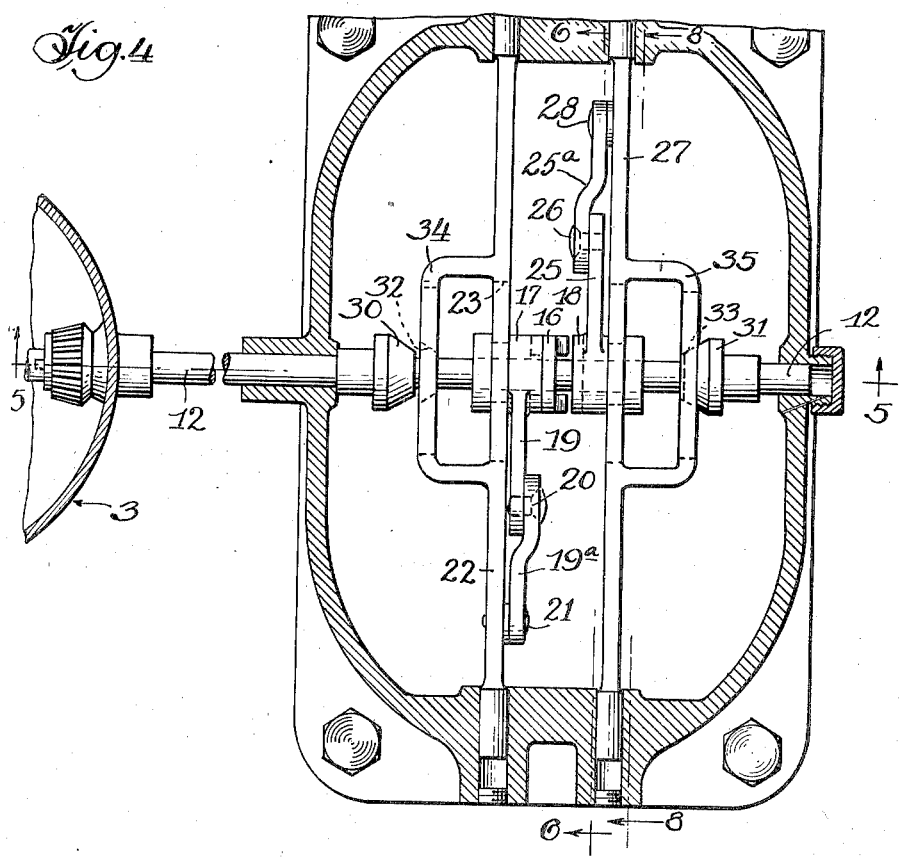

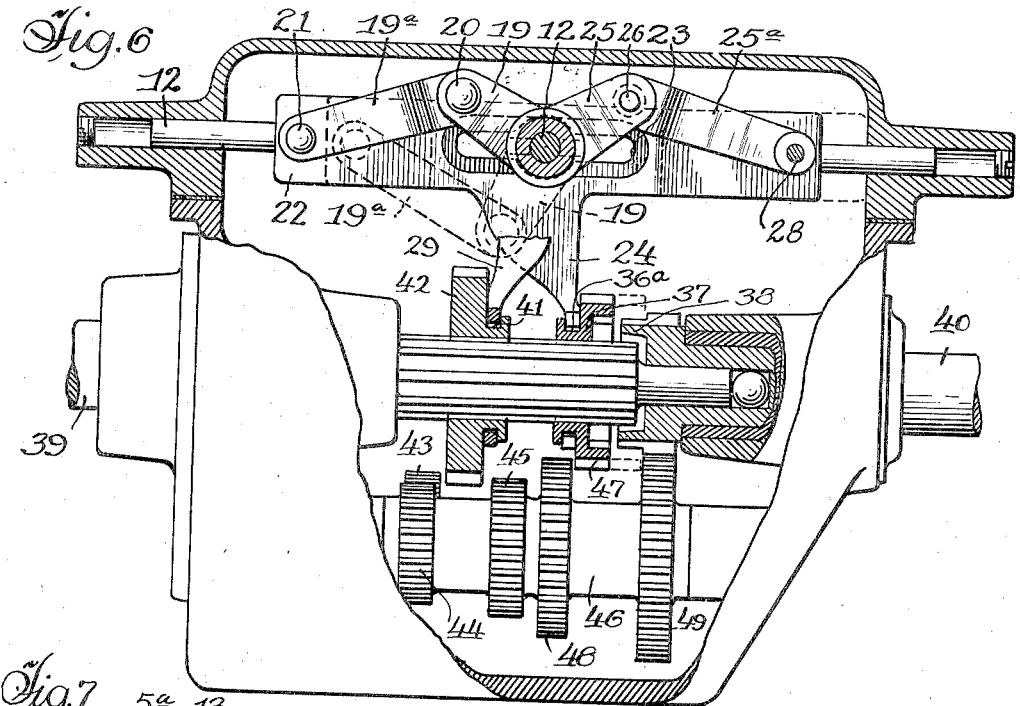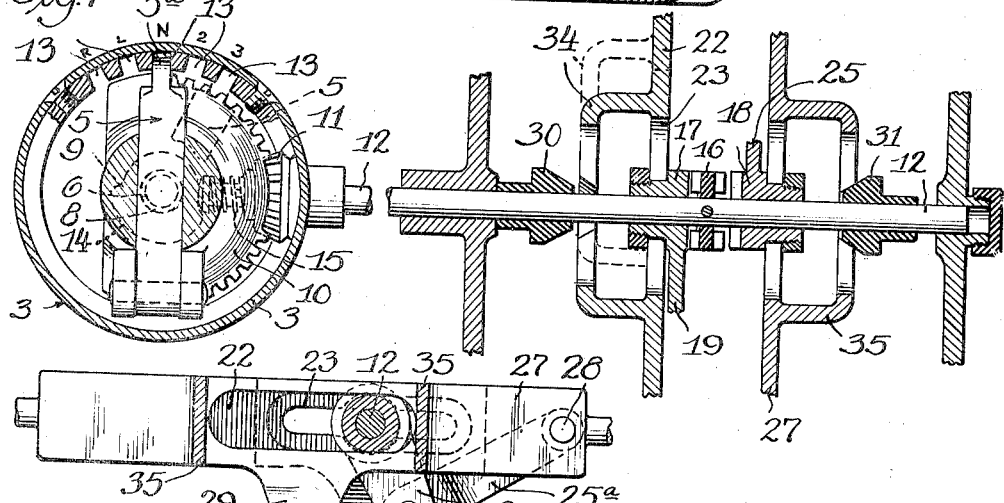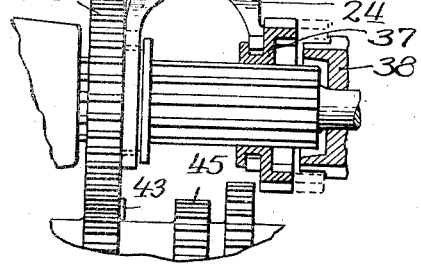

2,246,357

UNITED STATES PATENT OFFICE 2,246,357

UNIVERSAL CONTROL FOR CLUTCH OPERATION AND GEAR SELECTION FOR AUTOMOTIVE VEHICLES

Edward R. Hodgman, Chicago, Ill.

Application June 12, 1939, Serial No. 278,647

5 Claims. (Cl. 192—3.5)

The present invention relates to a novel actuating device associated with the usual clutch pedal for selective engagement and shifting of the gears with which an automotive vehicle is equipped, such as for reverse, low, intermediate and high, or with any additional gear combination. By means of the novel mechanism disclosed, from the front or driver's compartment of the vehicle there is eliminated the usual transmission lever, or with cars of the more recent types the hand controlled lever, which may be placed on the steering wheel or dash. The invention greatly increases the available space in such front compartment by eliminating the usual gear shift lever.

One object of the invention is to provide a single foot control for disengaging the usual clutch with which automotive vehicles are equipped, and also selectively engaging the various gears on such an automotive vehicle as well as in their neutral position.

Another object is to provide means for permitting the selection of one gear at a time and positively disengaging connections with other gears.

Still another object is to provide means for shifting gears without first returning to neutral position.

A still further object is to provide positive means actuated by the foot control mechanism for engaging reverse, low, intermediate and high gears without the necessity of the customary hand lever for shifting gears.

In the drawings:

Figure 1 is a perspective view with the floor board of a driving or transmission control of an automobile removed.

Fig. 2 is a fragmentary enlarged view, part in side elevation and part in vertical cross section, of the clutch and gear control mechanism.

Fig. 3 is a view in vertical cross section on the line 3—3 of Fig. 2.

Fig. 4 is a top plan view in section on the line 4—4 of Fig. 5.

Fig. 5 is a view in vertical cross section of the gear shifting mechanism taken on the line 5—5 of Fig. 4.

Fig. 6 is a side elevation with part of the transmission case broken away along the lines 6—6 of Fig. 4.

Fig. 7 is a fragmentary view similar to Fig. 4, with part of the operating mechanism shown in section.

Fig. 8 is a fragmentary view similar to Fig. 6 but in a different position.

1 is the ordinary clutch pedal mounted on an arm 2 which extends downwardly into a housing 3. The arm is pivoted at 4 in the housing so that a downward pressure on the pedal moves the rocker portion 2$^a$ of the arm 2 against a pivoted arm 5 as shown in Fig. 2. As the pivoted arm 5 is depressed downwardly it engages and depresses a plunger 6 which is connected at its lower end with a bell crank 7 fixed to a rock shaft 7$^a$ journalled in a bearing 7$^b$. The shaft 7$^a$, when rocked by the aforesaid depression of plunger 6, transmits a similar rocking action by way of a link 7$^c$ to an arm 7$^d$, the latter arm being in turn fixed to the clutch throwout shaft journalled in a bearing member 7$^e$ whereby to effect a disengagement of the clutch.

The plunger 6 is provided with a spiral compression spring 8 which operates to return the plunger to its normal upward operative position when the pressure on the pedal is released. Provision is made for swinging the pedal when depressed into a plurality of different positions in a small arc, one of which positions is shown in dotted lines, Fig. 1. As the pedal 1 and arm 2 are swung into any one of such positions, the gear shifting mechanism is rotated by the positive pivotal connection at 4 with the rotating gear shifting member 9 which extends downwardly through the center of the housing and carries a circular bevel gear 10. The bevel gear 10 is in mesh with and actuates a rotatable bevel gear 11 positioned near the bottom of the housing, the gear 11 is slidably keyed to a shaft 12 which initiates the gear shifting mechanism, and which shaft is longitudinally slidable for a purpose to be later more fully explained. The pivoted arm 5 extends intermediate through a slotted portion of the gear shifting member 9 and it is rotated with the gear shifting member. This pivoted arm 5 is shaped at its free end 5$^a$ to coact with a series of internal notches 13 corresponding to reverse, low speed, neutral, second speed, and high speed, or any intermediate speeds if the transmission is so equipped. Upon release of pressure on the clutch pedal the compression spring 8 forces the plunger 6 upwardly to swing the pivoted arm 5 into locking engagement with one of said notches where it is held in position in the predetermined gear selection until disengaged by pressure upon the pedal.

The longitudinally slidable shaft 12 extending into the housing 3 bears against a cam portion or face 14 of the gear shifting member 9. This cam face is clearly shown in Fig. 7. As the gear shift member is rotated by the arcuate movement of the clutch pedal, the cam portion 14 bears upon the end of the shaft 12 forcing it to move outwardly. A compression spring 15 is mounted at one end of the shaft to force and maintain the shaft into contact with the cam surface 14 at all times. The action of the cam 14 on the shaft acts to force the shaft 12, away from the axis of plunger 6 and the compression spring 15 acts to pull the shaft 12 into contact with the cam surface of gear shifting member 9. Fixedly keyed to the shaft 12 is a clutch member 16 having coacting engagement with either coacting clutch member 17 or clutch member 18 which are freely rotatably mounted on shaft 12. Shaft 12 may extend directly to the gear shifting mechanism or may be connected therewith by a plurality of rods and bell cranks or the like.

Fixedly attached to the clutch member 17 is a pair of toggle arms 19 and 19a pivoted at 20. Arm 19a is pivotally attached at 21 to the lever 22. Lever 22 is shiftable transversely to the axis of shaft 12 and is provided with a slot 23 which permits it to slide transversely of the shaft 12 within the opening of its slot. Carried on the lever 22 is a shifter fork 24 for cooperation with one set of gears.

Fixedly mounted to the second clutch member 18 is a similar pair of toggle arms 25 and 25a pivoted at 26. 25 is attached to one end of a second lever 27 at 28. Lever 27 likewise is provided with a slot similar to the slot 23 on lever 22 and carries a shifter fork 29 for cooperation with a second set of gears, as shown in Fig. 6.

Fixedly mounted to the shaft 12 are two conical shaped bearings 30 and 31. These bearings 30 and 31 reciprocate with the movement of the shaft 12 and the fixed clutch 16 and coacting with conical openings 32 and 33 of the levers 22 and 27 respectively. Thus when cam 30 fits into conical opening 32, lever 22 cannot be moved. Likewise when cam 31 fits into conical opening 33, lever 27 cannot be moved. The movement of one cam into locking position operates to release the supplementary cam from its locking engagement with the conical opening adjacent it. In the preferred embodiment shown in Fig. 4, I have extended the lever 22 to form a bracket 34. Lever 27 has a similar extension bracket 35. As the pedal 1 is moved in its arcuate direction or path the shaft 12 is given a longitudinal movement through action of the cam 14 and spring 15 and is rotated by reason of the meshing engagement of bevel gears 10 and 11 forcing the clutch 16, which is positively keyed on the shaft 12, into engagement with one of the clutch members 17 or 18 which in turn actuates the shifter forks.

In operation as shifter fork 24 is shifted by reason of the reciprocation of lever 22, it bears at its lower end against a collar 36a. Collar 36a is attached to female jaw clutch 37 which cooperates with male jaw clutch 38 whereby fork 24 carries the female jaw clutch 37 into contact with male jaw clutch 38. Female jaw clutch 37 is attached to and operates with the main drive shaft 39, and thus when female jaw clutch 37 and male clutch 38 are in contact with each other the main drive shaft 39 is driven at the same speed which the engine transmits to engine shaft 40. Under the foregoing conditions the vehicle is in high gear.

When fork 24 is moved in an opposite direction jaw clutch 36 is disengaged from female jaw clutch 37. This opposite movement of the fork 24 and lever 22 will move female jaw clutch 37 along the splined portion of shaft 39 as shown in Fig. 6. Female jaw clutch 37 is provided with a gear 47. Upon continuation of the movement of fork 24 away from male jaw clutch 38, gear 47 is brought into engagement with gear 48 which places the vehicle in second gear or intermediate speed. Gear 49 mounted on the countershaft 46 has meshing engagement with a gear portion of male jaw clutch 38 and is rotated at all times and drives the countershaft 46. Gears 44, 45, 48 and 49 being fixedly mounted on countershaft 46 enables gears 44, 45 and 48 to transmit rotative movement to either gear 43 or gears 42 or 47, when in contact therewith.

Fork 29 mounted on lever 27 at its lower end bears against a collar 41 which is attached to gear 42. Gear 42 is slidably mounted on the splined portion of shaft 39.

In operation, the gear 42 slides along the splined portion of the drive shaft 39 into engagement with gear 45, which produces low gear speed. To reverse the rotation of the shaft 39 and the direction of the vehicle, gear 42 is brought into meshing engagement with gear 43 as shown in Fig. 8.

Under this arrangement it will be seen that reciprocation of the shaft 12 and partial rotation of this shaft 9 will positively engage, disengage and place in neutral position the coacting gears to place the vehicle in high, intermediate and low speeds and reverse.

It may be deemed desirable to provide an indicator 36 which may be mounted on the steering rod of the car, on the dash-board or any convenient place, to indicate the selected gear position of the gears at neutral, reverse, low, second or third speeds.

In operation the pressure on the pedal 1 which releases the clutch at the same time serves to push arm 5 out of locking engagement with various notches provided for the respective positions, neutral, reverse, low, second and high speed. As thus released, the clutch pedal 1 may be partially rotated into one of several different positions, which partial rotation brings into play by cam and gear action a rotating and reciprocating shaft upon which are mounted clutch members for selectively engaging shifter forks, which in turn bring the required gears into and out of meshing engagement therebetween. The gears are so mounted that any sideways shift of the clutch pedal 1 immediately causes the supplementary drive gears to engage or disengage from meshing engagement. Continued partial rotation of the clutch pedal brings such gears into full meshing relation, and they may be so locked in meshing engagement upon releasing the clutch pedal, which in turn permits arm 5 to ascend and engage in the notches provided in the housing 3, as is clearly shown in Figs. 2 and 7.

Having thus disclosed the invention, I claim:

1. In an automobile equipped with the usual clutch mechanism, a foot pedal, means for disengaging the clutch when the pedal is depressed, means for selecting and engaging predetermined gears operable only when the pedal is partially rotated in depressed position, and means coacting with said second mentioned means for returning said previously selected gears to neutral position when the pedal is shifted to any different position.

2. In an automotive vehicle, a plurality of gears for propelling the vehicle at different speeds and in both directions, a shaft, clutch members directly mounted on said shaft, a manually actuated pedal adapted when in depressed position and partially rotated in an arcuate direction to both reciprocate and rotate said shaft, whereby said clutch members selectively engage and disengage said gears.

3. In a transmission for automobiles or other power propelled vehicles equipped with the usual clutch and drive gears, a single control comprising a pedal, an arm coacting with said pedal means intermediate the arm and clutch and including a plunger adapted to be depressed to release the clutch when the pedal is pushed downwardly, a rotatable gear shifting member provided with a cam surface, a gear mounted on said gear shifting member and adapted to be rotated by an arcuate movement of the pedal and arm, a longitudinally movable shaft adapted to bear against and be maintained in contact with the cam face of the gear shifting member to be reciprocated thereby, a gear in meshing engagement with said last mentioned gear and keyed to and adapted to rotate said shaft but fixed against longitudinal movement, a pair of clutch members free on said shaft, a fixed clutch member for locking engagement with said free clutch members, and means cooperating with said free clutch members to selectively engage different sets of driving gears.

4. In a transmission for automobiles or other power propelled vehicles equipped with the usual clutch and drive gears, a single control comprising a pedal, an arm coacting with said pedal means intermediate the arm and clutch and including a plunger adapted to be depressed to release the clutch when the pedal is pushed downwardly, a rotatable gear shifting member provided with a cam surface, a gear mounted on said gear shifting member and adapted to be rotated by an arcuate movement of the pedal and arm, a longitudinally movable shaft adapted to bear against and be maintained in contact with the cam face of the gear shifting member to be reciprocated thereby, a gear in meshing engagement with said last mentioned gear and keyed to and adapted to rotate said shaft but fixed against longitudinal movement, a pair of clutch members free on said shaft, a fixed clutch member for locking engagement with said free clutch members, and means cooperating with said free clutch members to selectively engage different sets of driving gears, comprising a plurality of reciprocating levers, a fork mounted on each of said levers, a drive shaft and countershafts, a pair of complemental clutch members cooperating with said drive shaft, a plurality of gears mounted on said drive shaft and countershafts, and means actuated by said forks for engaging, disengaging and holding in neutral position the said gears and said complementary clutches in predetermined combination with each other.

5. In an automotive vehicle having a plurality of gears for propelling the vehicle in both directions and at different speeds in forward direction and a clutch for engaging and disengaging said gears, a single control member for controlling said clutch and selectively initiating meshing engagement and disengagement of said gears, a shaft actuated by said single control member, two clutch members freely mounted on said shaft, a third clutch member fixedly mounted on said shaft for selective engagement with either of said freely mounted clutch members, a plurality of levers transversely shiftable with respect to the axis of said shaft, an elongated opening in each of said levers, means for locking any one of said levers in fixed position comprising a conical shaped bearing secured on said shaft and coacting with an opening in said lever, a plurality of shifter forks mounted on said transversely shiftable levers, toggle levers actuating said shifter forks and shiftable levers, said toggle levers being connected at one end to the said freely mounted clutch members and at the other end to said transversely shiftable levers.

EDWARD R. HODGMAN.

CERTIFICATE OF CORRECTION.

Patent No. 2,246,357.  June 17, 1941.

EDWARD R. HODGMAN.

It is hereby certified that error appears in the printed specification of the above numbered patent requiring correction as follows: Page 3, second column, line 15, claim 4, for the word "clutches" read --clutch members--; and that the said Letters Patent should be read with this correction therein that the same may conform to the record of the case in the Patent Office.

Signed and sealed this 23rd day of September, A. D. 1941.

(Seal)

Henry Van Arsdale,
Acting Commissioner of Patents.